Patented Dec. 27, 1932

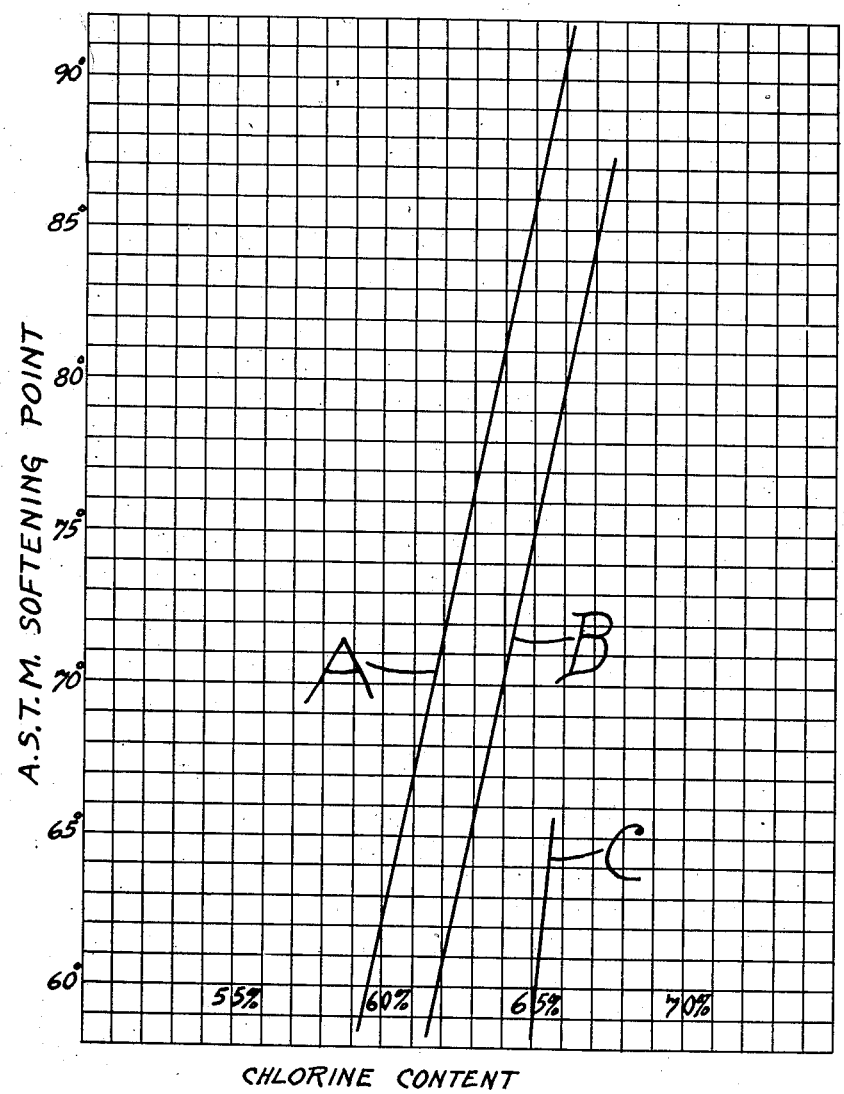

1,892,398

UNITED STATES PATENT OFFICE

RUSSELL L. JENKINS, OF ANNISTON, ALABAMA, ASSIGNOR TO SWANN RESEARCH, INC., A CORPORATION OF ALABAMA

NONCRYSTALLINE HIGHLY CHLORINATED DIARYL RESIN

Application filed September 28, 1929. Serial No. 395,738.

This invention relates to the production of non-crystalline highly chlorinated diaryl resins.

It further relates to the method by which the softening point of the higher chlorinated diaryls may be varied.

It has previously been observed, when chlorinating diphenyl, that when the chlorine content reaches the neighborhood of 68%, the material which up to this point has remained a more or less viscous liquid, suddenly became crystalline. I have also found that the softening points of chlorinated diphenyl which contain less than 68% of chlorine are rather low, in most cases falling below 64° C.

It is an object of this invention to provide a means whereby the higher chlorinated diphenyls may be produced in a permanent, stable, non-crystalline, solid state. It is a further object of this invention to provide a means whereby the higher chlorinated diaryl resins can be produced with a higher softening point than in the case of diphenyl alone. Both of these objects are accomplished by mixing with the diphenyl, before chlorination, various percentages of complex high-boiling compounds which are formed as a by-product in the thermal synthesis method of producing diphenyl.

In the accompanying drawing there is shown a graphical illustration of the effect of my invention on the softening point and crystallizing tendency of chlorinated diphenyl. The curve marked 60—40 refers to a mixture composed of 60% diphenyl and 40% high boiling compound, while that marked 80—20 refers to mixtures of 80% diphenyl and 20% high boiling compound. The curve marked 100% diphenyl could not be carried to higher softening points because of the crystallizing tendency. It should be noted that in this specification the softening points have been determined by the A. S. T. M. standard method.

The softening point of the resins herein described is determined by means of the ring and ball method known as the standard method of test for softening point of bituminous materials or A. S. T. M. method—D 36—24.

The method consists briefly in determining the temperature at which the resin being tested will flow out of a metallic ring ¾ inch in diameter and ½ inch thick under the influence of the weight of a small steel ball of specified weight and dimensions and just touch a plate exactly 1 inch below the bottom of the ring. To prepare for the test the resin is cast into the ring in the molten condition. Heating of the resin during the test is accomplished by immersing the ring into water which can then be heated at the specified rate. Further details of the test are given in the above publication.

The high-boiling compounds which I have found it desirable to mix with diphenyl in order to obtain the above results are of a particularly complex nature, and I have not been able to identify them chemically, although I believe them to be complex diaryls. However, they are produced in varying amounts, together with diphenyl, when pure benzol or benzol containing toluene and xylene are heated to the diphenyl forming temperature. The diphenyl is separated from the product of the diphenyl reaction by distillation. The product of the diphenyl reaction may contain benzol, diphenyl, and the various unknown complex compounds making up the high-boiling compounds mentioned above.

Separation is effected by first distilling off everything boiling under 200° C., then separating the fraction between 200° and 270° C., which comprises the diphenyl fraction. The fraction boiling between 270° and 400° C. contains the high boiling compounds which I have identified as having the valuable properties mentioned above.

Example I

Take a mixture of 80% diphenyl and 20% high boiling compounds, obtained as described above. Chlorinate this by passing in chlorine gas while the reacting mixture is in contact with iron at a temperature varying between 175° and 220° C. When 60% by weight of chlorine has been absorbed, the softening point is considerably below 60° C., probably in the neighborhood of 52° C. When 62% of chlorine has been absorbed, the softening point has reached a temperature of approximately 61° C. Further chlorination to 65% chlorine results in a softening point in the neighborhood of 81° C. Various other softening points may be obtained in this manner, as desired, by suitably varying the chlorine content.

*Example II*

Take a mixture of 60% diphenyl and 40% diphenyl high boiling compound obtained as described above. Chlorinate this in the manner described in Example I. When 60% by weight of chlorine has been absorbed, the softening point will be found to be in the neighborhood of 62° C. On chlorinating the mixture further until 62% chlorine has been absorbed, it will be found that the softening point has reached a temperature of 72° C. Further chlorination to 65% chlorine results in a product having a softening point of 86° C. Various other intermediate softening points may be obtained by suitably varying the chlorine content.

By further increasing the amount of high boiling compounds, it is possible to still further increase the softening point. In fact, by chlorinating the high boiling compounds alone, a considerably higher softening point may be reached, and with a correspondingly lower chlorine content. The softening points which I have obtained and the corresponding chlorine content are given below in tabular form:

| Per cent chlorine in high boiling compound | Softening point ° C. |
|---|---|
| 52.5 | 99.5 |
| 63.6 | 121.5 |
| 63.9 | 125.5 |

The examples above described indicate only three ways in which the softening point may be changed. It is, however, obvious that this invention contemplates the use of all possible mixtures of diphenyl and the high boiling compounds or even high boiling compounds alone for the production of the chlorinated product. Instead of mixing the diphenyl and high boiling compounds before chlorinating, it is also practical to chlorinate the diphenyl and the diphenyl high boiling compound separately, and then mix them after chlorination with equally satisfactory results.

In general, it may be said that an increase in chlorine content of 2% increases the softening point approximately 10°.

What I claim is:

1. As a new composition of matter a non-crystalline resinous composition essentially comprised of chlorinated diaryls, said diaryls having been produced during the thermal synthesis of diphenyl from benzol.

2. As a new composition of matter a non-crystalline composition having a softening point between 60 and 90° C. essentially comprised of chlorinated diaryls, said diaryls having been produced during the thermal synthesis of diphenyl from benzol.

3. As a new composition of matter, a chlorinated, non-crystalline diaryl resin consisting of a mixture of chlorinated diaryls, said resins having a softening point between 50° and 125° C., and a chlorine content of more than 60 and less than 69 per cent.

4. As a new composition of matter, a chlorinated, non-crystalline diaryl resin, consisting of a mixture of chlorinated diphenyl and other complex chlorinated diaryls.

5. As a composition of matter, a chlorinated, non-crystalline diaryl resin, consisting of a mixture of chlorinated diphenyl and other complex chlorinated diaryls, said mixture having a softening point lying between 60 and 90° C.

6. As a new composition of matter, a chlorinated non-crystalline, diaryl resin, consisting of a mixture of chlorinated diphenyl and other complex chlorinated diaryls, said mixture having a softening point lying between 50° and 125° C., and a chlorine content of more than 60 and less than 69 percent.

7. The process of producing chlorinated non-crystalline diaryl resins, which comprises chlorinating a mixture of diaryl compounds until said mixture has a chlorine content of more than 60%.

8. The process of producing chlorinated non-crystalline diaryl resins, which comprises chlorinating a mixture of diaryl compounds in the presence of iron as a chlorination catalyst.

9. The process of producing chlorinated non-crystalline diaryl resins, which comprises chlorinating a mixture of diaryl compounds in the presence of iron as a chlorination catalyst until said mixture has a chlorine content of more than 60%.

10. The process of producing chlorinated non-crystalline diaryl resins, which comprises mixing diphenyl with those complex high boiling diaryl compounds formed during the diphenyl synthesis operation and chlorinating said mixture to a predetermined chlorine content.

11. The process of producing non-crystalline chlorinated diphenyl containing resins comprising chlorinating a mixture of diphenyl and other diaryls to a predetermined chlorine content.

12. As a new composition of matter a series of chlorinated diaryl resins having a relation between softening point and chlorine content such that a 2% increase in the latter property results in a 10° C. increase in the former property.

13. As a new composition of matter a series of chlorinated diaryl resins containing chlorinated diphenyl and having a relation between softening point and chlorine content such that a 2% increase in the latter property results in a 10° C. increase in the former property.

In testimony whereof I affix my signature.

RUSSELL L. JENKINS.